(No Model.) 2 Sheets—Sheet 1.

T. PARKER.
SLUICEWAY AND FLOOD GATE.

No. 418,876. Patented Jan. 7, 1890.

Witnesses
W. W. Mortimer
F. Stanly Elmore

Inventor
Thomas Parker
By his Attorney
Philip T. Dodge (No Model.) 2 Sheets—Sheet 2.

T. PARKER.
SLUICEWAY AND FLOOD GATE.

No. 418,876. Patented Jan. 7, 1890.

on line y-y on line x'-x' on line z-z

Witnesses Inventor
Thomas Parker
By his Attorney

UNITED STATES PATENT OFFICE.

THOMAS PARKER, OF MENOMONEE, WISCONSIN.

SLUICEWAY AND FLOOD-GATE.

SPECIFICATION forming part of Letters Patent No. 418,876, dated January 7, 1890.

Application filed September 4, 1889. Serial No. 322,934. (No model.)

*To all whom it may concern:*

Be it known that I, THOMAS PARKER, of Menomonee, in the county of Dunn and State of Wisconsin, have invented certain Improvements in Sluiceways and Flood-Gates, of which the following is a specification.

This invention relates to that class of rising and falling dams and gates which are commonly known as "bear-trap dams," and relates more particularly to improvements upon dams or gates of the general character represented in Letters Patent No. 372,040, granted to me on the 25th day of October, 1887.

The principal objects of the present invention are to simplify and reduce the cost of construction, to reduce the length of the base or foundation in proportion to the height of the dam, and to secure certain other advantages which will hereinafter appear.

To this end the invention consists, essentially, in the combination of two main leaves hinged to the base or foundation, with an intermediate connecting-leaf jointed to them, and an overlying apron or finger hinged to one of the main leaves and arranged to slide freely upon the other, as will hereinafter appear.

Figure 1:
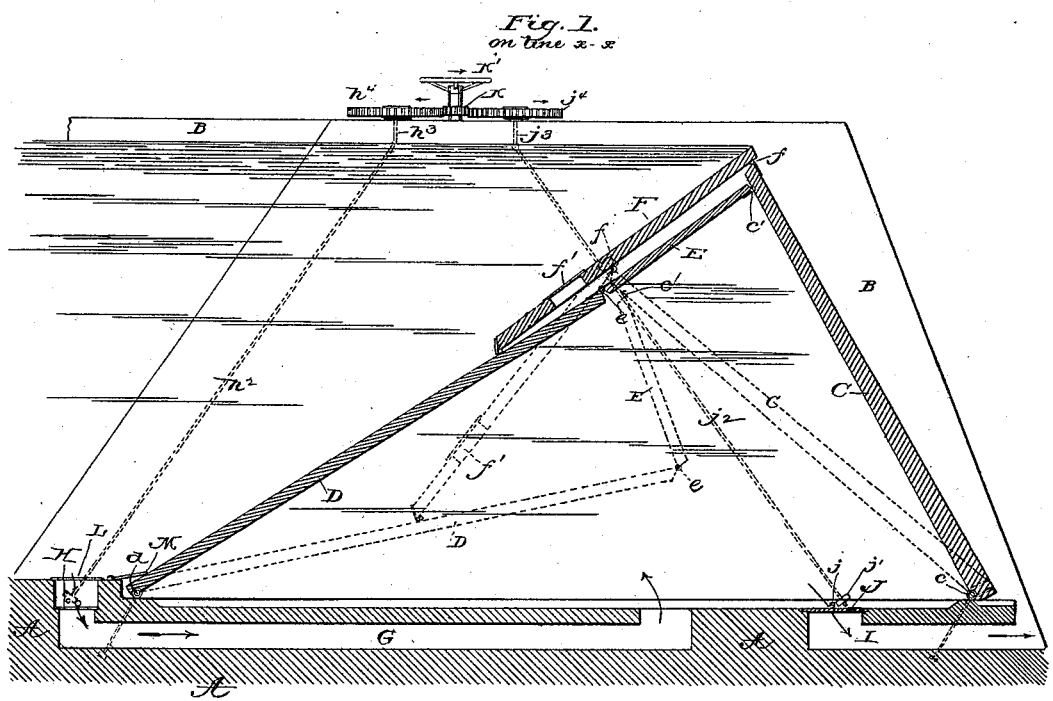
Figure 2:
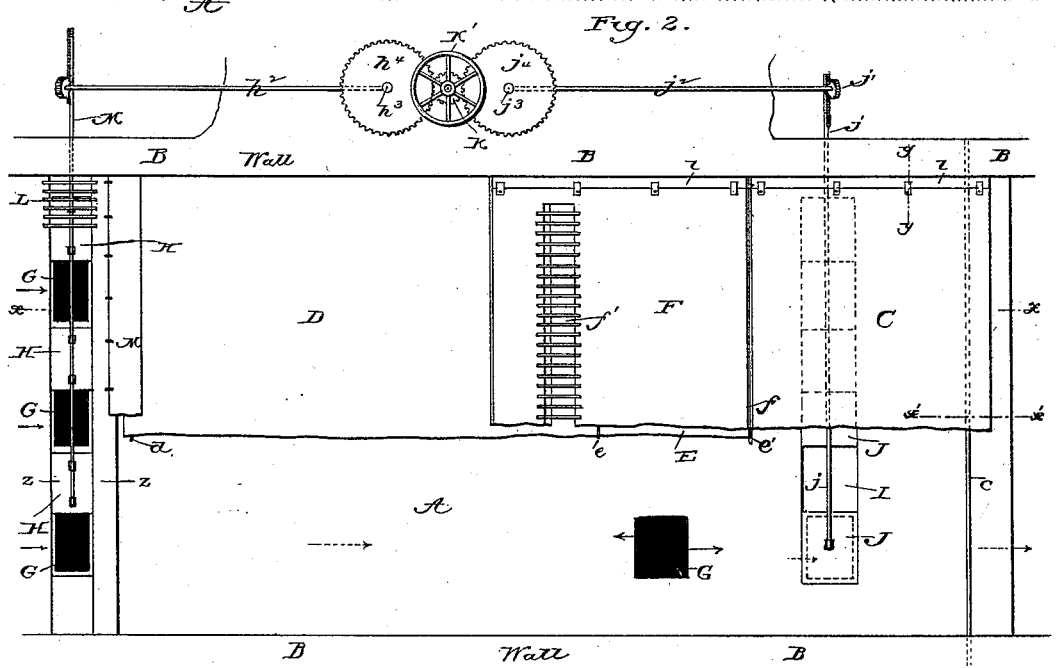
Figure 3:
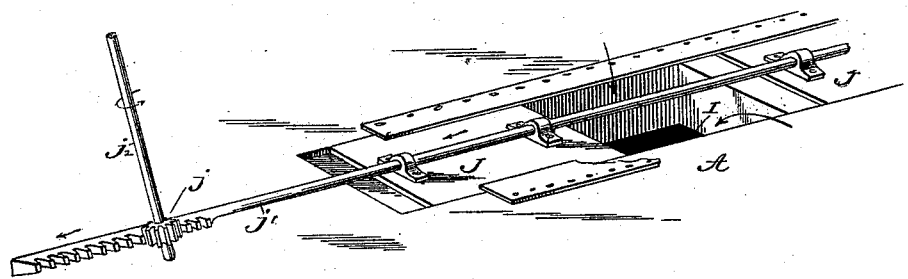
Figure 4:
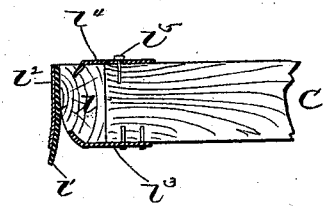
Figure 5:
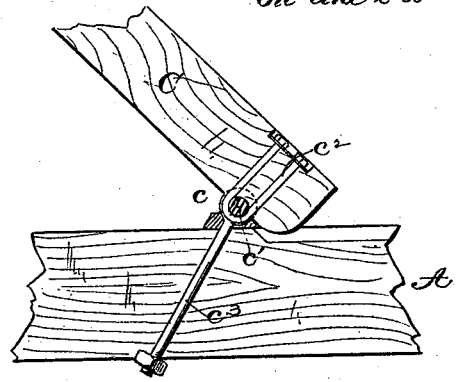
Figure 6:
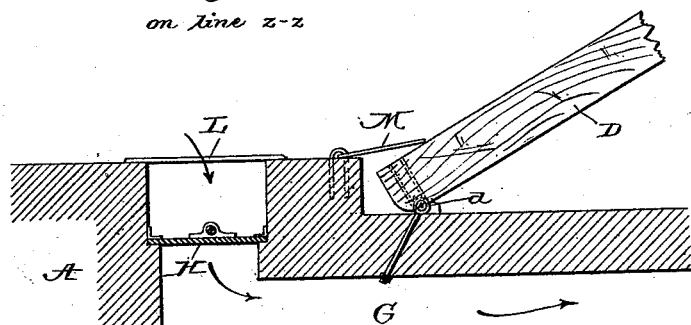

In the accompanying drawings, Figure 1 represents a vertical transverse section of a dam constructed on my plan on the line $x\ x$ of Fig. 2. Fig. 2 is a top plan view of the same, a portion of the dam proper being broken away to expose the parts thereunder. Fig. 3 is a perspective view showing one of the controlling gates or wickets and its operating devices. Fig. 4 is a transverse vertical section through the side of the dam on the line $y\ y$ of Fig. 2, showing the packing to prevent leakage. Fig. 5 is a vertical section on the line $x'\ x'$ of Fig. 2, showing one of the hinges and the hinge-joints by which the leaves are connected to the foundation. Fig. 6 is a vertical section on the line $z\ z$ of Fig. 2, showing the construction of the joints, water-passages, and wickets at the upper end of the dam.

Referring to the drawings, A represents a base or foundation constructed in any appropriate manner adapted to contain the passages or flumes, and to sustain the dam-sections hereinafter described.

B B are two vertical side walls or abutments rising from the foundation and adapted to receive the dam proper between them.

The dam or gate consists of the two main leaves or sections C and D, the intermediate section E, and the overlying apron F. The section C is connected at its lower or downstream end by a horizontal hinge $c$ to the foundation. At its upper end this leaf C is connected by a horizontal joint $c'$ to one end of the shorter leaf E, which latter is in turn connected by a horizontal hinge $e$ to the lower or downstream edge of the long main leaf D, which is connected to the foundation at $d$ by a horizontal hinge-joint. The leaves C, D, and E are constructed of wood or metal framed together in any appropriate manner without openings, and the several joints so fitted as to prevent the passage of water through them. It will thus be seen that the leaves C, D, and E form, in connection with the underlying foundation and side walls, a chamber in which water admitted at the base may be closely confined.

The joints are constructed in such manner that the leaves D and E may fold downward and inward, thus allowing the leaf C to fold downward upon them, in the manner indicated by dotted lines, the several sections being thus enabled to rise and fall freely and to fold from the elevated position shown in Fig. 1 through the various intermediate stages to a practically flat form upon the foundation.

The apron F is hinged to the upper end of the leaf C at $f$, and extending downward over the leaf E rests at its upstream end loosely on the upper surface of the leaf D, on which it is free to slide or move to or fro as the dam rises or falls. This overlying apron is provided with openings $f'$ or with other suitable openings to admit of the water passing freely into and out of the space between it and the underlying leaves, which latter are thus subjected to the direct pressure of the external water. The openings are preferably covered, as shown, by a grating to prevent the passage of sticks or other obstructive matters into the space beneath it.

For the purpose of effecting the elevation and depression of the dam, I propose to provide passages or sluices of any suitable form or arrangement for admitting water from the upstream side into the chamber or space beneath the leaves and for permitting it to escape from this chamber on the downstream side. I prefer to employ for this purpose the peculiar arrangement of passages and controlling wickets or gates represented in the drawings. As shown in the drawings, passages G, the number of which may be varied at will as demanded by the size of the dam, extend downward into the foundation from a point in advance of the leaf D and pass thence horizontally under the dam, where they emerge in an upward direction into the internal chamber. Horizontally-sliding wickets or gates H, located, preferably, at the mouths of the passages G, as shown, control the admission of water therethrough into the interior of the dam. Passages I, the number of which may be greater or less, as required, open from the interior chamber through the foundation and emerge beyond the lower or downstream side of the dam, serving to discharge the water when the dam is to be lowered. Horizontally-sliding gates or wickets J serve to open and close these passages.

When the dam is to be elevated, the wickets J are closed and the wickets H opened, whereupon the water passing from the external side through the passages G into the interior chamber, where it is confined, acts to elevate the dam.

When the dam is to be lowered, the wickets H are closed and the wickets J opened, whereby the water is permitted to escape from the internal chamber and the dam caused to descend in a positive manner by the preponderant pressure of the water against the outside of the leaves.

The dam may be supported at any required elevation by properly adjusting the inlet and outlet wickets in relation to each other so as to permit a greater or less quantity of water to flow through them, respectively.

It will be observed that the water-pressure above and below the apron F is practically equalized, and that this apron has no material influence upon the rising or falling actions of the dam. Its office is to protect the dam from injury from the impact of logs or other floating bodies descending the stream, and also to prevent bodies which may sink below the surface from lodging between the folding leaves D and E in such manner as to prevent the descent of the dam. The sliding edge of the apron may be provided with anti-friction rollers, as shown, to secure an easy movement; and, if desired, the leaf D may be provided with rails or trams for the edge of the apron to move upon, these guides being constructed, if desired, to hold the edge of the apron down in place thereon. As these features are not of the essence of my invention, and may be made in well-known forms, a detailed description is unnecessary.

The sliding wickets may be operated by any suitable means, but I recommend the arrangement shown in the drawings. The wickets J are connected, as shown in Figs. 1, 2, and 3, to a horizontal rack-bar $j$, actuated by a pinion $j'$ on the lower end of an upright shaft $j^2$, so that the rotation of the shaft causes the opening or closing of the wickets J.

The gates H are provided in like manner with a rack-bar operated by a pinion and upright pinion-shaft $h^2$. The pinion-shafts $h^2$ and $j^2$ converge toward their upper ends, where they are connected, respectively, by universal joints of any character, to vertical shafts $h^3$ and $j^3$, mounted in suitable bearings and provided, respectively, with gear-wheels $h^4$ and $j^4$, engaging an intermediate operating-pinion K, attached to a hand-wheel K'. By turning the wheel and pinion the gears $h^4$ and $j^4$ are caused, through the intermediate parts, to move the inlet and outlet wickets simultaneously in opposite directions; or, in other words, to open one set of wickets at the same time the others are closed. Thus it is that by the single operation of turning the hand-wheel the attendant is enabled to regulate the rise and fall of the dam at will.

The grating L is commonly applied over the mouths of the inlet-passages to exclude obstructive matters therefrom.

The edges of the leaves acting against the side walls or abutments may be constructed or packed in any appropriate manner to prevent leakage; but I recommend the packing shown in Fig. 4, in which $l$ represents a bar detachably secured to the edge of the gate between it and the abutment, and provided on the outer face with a sheet of rubber or equivalent packing material $l'$, retained in place by an overlying metal plate $l^2$. The packing is exposed on the inner or lower edge, as shown in Fig. 4, so that the internal water-pressure may act thereon to force it outward against the wall and thus prevent leakage. The strip $l$ may be detachably secured to the leaf of the dam by any appropriate fastening devices. As shown in the drawings, it is held by the clips $l^3$, fastened permanently to the inside of the leaf, and the clips $l^4$, movably attached to the outside of the leaf by lag-screws $l^5$. The loosening of these screws releases the strip $l$, so that it may be removed with the packing thereon to admit of its renewal or adjustment, as may be required. It is to be noted that this construction admits of the packing being readily repaired or adjusted without disturbing the other parts of the dam. The hinge-joints by which the leaves are united with each other and with the foundation may be of any appropriate character. I commonly unite the main leaf C to the foundation by a joint such as shown in Fig. 5, in which $c'$ represents a horizontal rod or hinge-pin lying between the leaf and the foundation, and connected to the former by stirrup-bolts $c^2$ and to the latter by eye-bolts $c^3$. The joint connecting the leaf D to the foundation is of like construction, as shown in Fig. 6.

In order to protect the upstream end of the leaf D and prevent obstructive matters from lodging thereunder, I make use of an overlying plate or apron M, hinged to the foundation at one edge and resting at the other freely on top of the leaf.

Having thus described my invention, what I claim is—

1. In a rising and falling dam, the two main leaves hinged to the base and the intermediate leaf hinged to and connecting the main leaves, as shown, in combination with the apron hinged to one of the main leaves and sliding upon the other, as shown.

2. In a rising and falling dam, the two main leaves hinged at their distant ends to the base, the connecting-leaf hinged at opposite edges to the main leaves, said leaves adapted to confine the water beneath them, in combination with the apron overlying the intermediate leaf, sustained by the main leaves, and provided with openings for the passage of the water therethrough, whereby said apron is adapted to protect the leaves from injury or obstruction without materially affecting the movement of the dam.

3. In combination with the rising and falling dam, the passages for admitting water thereto and therefrom, the gates controlling said passages, the rack-bars and pinions, the converging pinion-shafts, and the gear connecting said shafts.

In testimony whereof I hereunto set my hand, this 28th day of August, 1889, in the presence of two attesting witnesses.

THOMAS PARKER.

Witnesses:
P. T. DODGE,
W. R. KENNEDY.